United States Patent [19]

Johnson

[11] Patent Number: 5,785,724
[45] Date of Patent: Jul. 28, 1998

[54] PROFILED RESILIENT BAND FOR SECURING FILTER BAG

[75] Inventor: Joe Johnson, Blackburn, United Kingdom

[73] Assignee: Scapa Group PLC, Lancashire, United Kingdom

[21] Appl. No.: 702,485

[22] PCT Filed: Mar. 21, 1995

[86] PCT No.: PCT/GB95/00626
 § 371 Date: Nov. 12, 1996
 § 102(e) Date: Nov. 12, 1996

[87] PCT Pub. No.: WO95/25580
 PCT Pub. Date: Sep. 28, 1995

[30] Foreign Application Priority Data

Mar. 22, 1994 [GB] United Kingdom ............... 9405650

[51] Int. Cl.⁶ ............................................. B01D 46/02
[52] U.S. Cl. ......................... 55/377; 55/341.1; 55/378; 55/508
[58] Field of Search ................... 55/377, 378, 376, 55/374, 341.1, 509, 508; 95/273

[56] References Cited

U.S. PATENT DOCUMENTS

| | | | |
|---|---|---|---|
| 1,805,174 | 5/1931 | Gudka | 55/378 |
| 2,308,309 | 1/1943 | Ruemelin et al. | 55/377 |
| 2,308,310 | 1/1943 | Ruemelin, Jr. et al. | 55/378 |
| 3,747,305 | 7/1973 | O'Dell et al. | 55/378 |
| 4,015,961 | 4/1977 | Howard et al. | 55/378 |
| 4,244,718 | 1/1981 | Noddin | 55/377 |
| 4,266,954 | 5/1981 | Oare et al. | 55/377 |
| 4,272,263 | 6/1981 | Hancock | 55/377 |
| 4,291,904 | 9/1981 | Iversen et al. | 55/378 |
| 4,292,057 | 9/1981 | Ulvestad et al. | 55/377 |
| 4,310,336 | 1/1982 | Peterson | 55/377 |
| 5,061,303 | 10/1991 | Williams et al. | 55/341.1 |

FOREIGN PATENT DOCUMENTS

| | | | |
|---|---|---|---|
| 2407731 | 1/1979 | France | 55/378 |
| 2543931 | 4/1977 | Germany | |
| 2827926 | 1/1979 | Germany | |
| 1603110 | 11/1981 | United Kingdom | 55/377 |

*Primary Examiner*—Duane Smith
*Attorney, Agent, or Firm*—Jacobson, Price, Holman & Stern, PLLC

[57] ABSTRACT

A filtering apparatus has a bag or sleeve connected to a profiled resilient band (10, 20). The band is operative to sealing engage an aperture (13, 16) in a further body (16, 27). The profiled band (10, 20) has a one piece construction.

10 Claims, 1 Drawing Sheet

PROFILED RESILIENT BAND FOR SECURING FILTER BAG

BACKGROUND OF THE INVENTION

The present invention relates to a filtering apparatus.

With the filtering apparatus of the kind which comprise at least one filter bag or filter sleeve it is common practice to provide a sealing ring around the periphery of the bag or sleeve.

GB 1603110 describes a filtering apparatus comprising a bag or sleeve having a sealing arrangement comprising a ring of felt having a radially outwardly directed flange. A spring steel or rubber ring is provided between the filter material and the felt ring. In use, the felt flange is received in an appropriately profiled rim of an aperture in a partition wall through which the bag is disposed. In practice, the flange is built up by appropriate application of strips of felt. Alternatively plastics, rubber rings, ropes and so forth may be used to build up the flange. Much time and effort is taken up in making these products and considerable skill is required.

SUMMARY OF THE INVENTION

The present invention has been made from a consideration of this problem.

According to the present invention there is provided a filtering apparatus comprising a filter bag or sleeve, a profiled resilient band connected to a part of the filter bag or sleeve, the profiled band being operative to sealingly engage, or being operative to cause the filter bag or sleeve to sealingly engage, the periphery of an aperture in a further body, wherein the profiled band has a one piece construction and wherein holes and/or slots are provided in the band.

Since the profiled band has a one piece construction, this eliminates the effort and skill involved in making such profiled bands from a number of separate parts. Accordingly the bands are less expensive to manufacture.

The resilience may be provided by using a resilient material, such as spring stainless steel or hard rubber. However, it is desirable that the bands are easily compressible by hand while being sufficiently resilient to retain their original shape when the compressive force has been removed. This is achieved by providing holes, slots or the like in the band, particularly in the projections forming the profiled regions of the band. In some embodiments of the invention it is desirable to provide open ended holes, slots or the like at one or both edges of the band.

The top of the filter bag or sleeve may be secured to the band by sewing, adhesive or welding. The band imposes a profile on the top of the filter fabric.

BRIEF DESCRIPTION OF THE DRAWINGS

In order that the present invention may be more readily understood specific embodiments thereof will now be described by way of example only with reference to the accompanying drawings in which.

DESCRIPTION OF THE PREFERRED EMBODIMENTS

Figure 1:
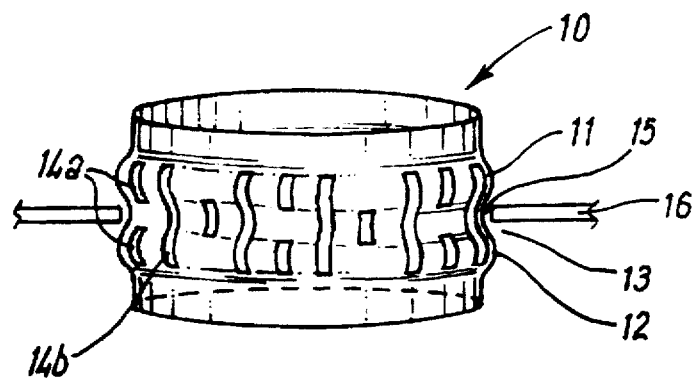
FIG. 1 is a side elevation of one filter band in accordance with the invention.

Referring to FIG. 1 a filtration apparatus comprises a filter sleeve (not shown) secured to an endless sealing band 10.

The band 10 is made from spring stainless steel, typically in the order of 0.38 mm thick. Two projections 11,12 extend radially outwardly from the band 10 so as to define a channel 13 therebetween. A number of slots 14a, 14b are provided in the band in the region of the projections so as to ensure that the projections are readily resiliently deformable. In some instances separate slots 14a are provided in the two projections and in other locations an elongated single slot 14b is provided which spans both projections. The band 10 is secured directly to the filter sleeve by sewing or welding.

In use the band is received in an aperture 15 defined by a cell plate 16. One of the projections is compressed by hand and inserted into the aperture 15 at which time the projection springs outwardly and the boundary of the aperture 15 is securely captured in the channel 13 defined between the projections 11 and 12. The channel 13 sealingly engages the boundary of the aperture 15 such that a dust tight seal is provided.

Figure 2:
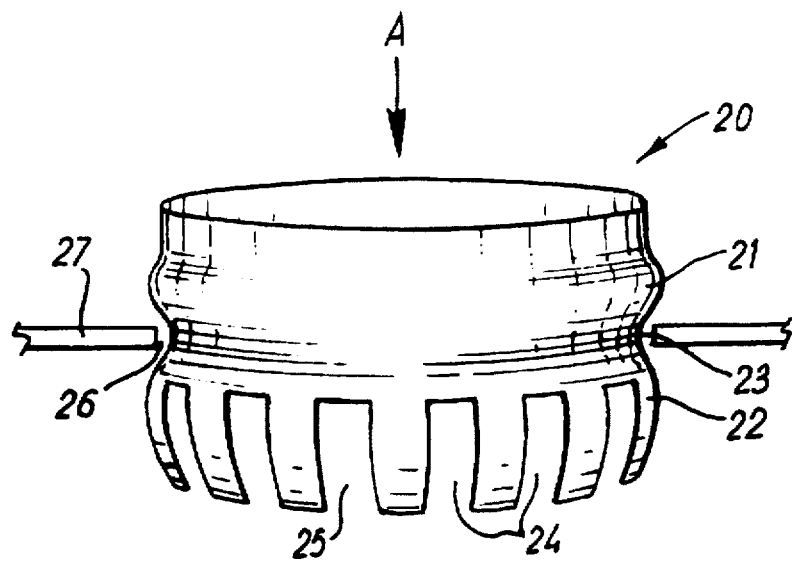
FIG. 2 is a side elevation of a second filter band in accordance with the invention.

Referring to FIG. 2 a second spring stainless steel band 20 comprises projections 21,22 defining a channel 23 therebetween. A plurality of open ended slots 24 are provided at one end of the band 20. The free ends of the flanges 25 defining the slots are directly inwardly. The band is secured directly to the top of the filter sleeve by sewing or welding.

In use the band is inserted in direction "A" into an aperture 26 in a filter cell plate 27. As the ends of the flanges 25 are directly inwardly the flanges automatically move inwardly as the band is inserted into the aperture 26. Once in position the flanges 25 spring outwardly and the cell plate is securely captured in the channel 23 so as to provide a dust tight seal.

The bands described above are considerably easier and cheaper to manufacture than known sealing bands for filter sleeves, but remain simple to use and effective in operation.

It is to be understood that the above described embodiments have been described by way of illustration only. Many modifications and variations are possible.

I claim:

1. A filtering apparatus comprising a filter bag or sleeve, a profiled resilient band connected to a part of the filter bag or sleeve, the profiled band being operative to sealingly engage, or being operative to cause the filter bag or sleeve to sealingly engage, the periphery of an aperture in a filter body, the profiled band having a one piece construction and a profiled region comprising one or more projections defining a channel, and holes or apertures provided in said profiled region of the band.

2. A filtering apparatus as claimed in claim 1, wherein the band comprises a resilient material.

3. A filtering apparatus as claimed in claim 1, wherein the band comprises spring stainless steel.

4. A filtering apparatus as claimed in claim 1, wherein the band comprises rubber.

5. A filtering apparatus as claimed in claim 1, wherein the holes or apertures are provided in at least one edge of the band.

6. A resilient band for sealingly engaging a filter bag or sleeve in an aperture of a filtering apparatus which comprises a profiled region having at least one projection defining a channel, and, openings provided in said profiled region to permit said projection to compress upon engagement with the periphery of the aperture and assist in seating of said periphery in said channel.

7. The resilient band of claim 6, wherein the band is a one piece member.

8. The resilient band of claim 6, wherein the band comprises a spring stainless steel.

9. The resilient band of claim 6, wherein the band comprises rubber.

10. The resilient band of claim 6, wherein the openings comprise slots or holes.

* * * * *